United States Patent [19]
Burnett

[11] Patent Number: 5,231,834
[45] Date of Patent: Aug. 3, 1993

[54] MAGNETIC HEATING AND COOLING SYSTEMS

[76] Inventor: James E. Burnett, 16500 Marquis Ave., Cleveland, Ohio 44111

[21] Appl. No.: 572,622
[22] Filed: Aug. 27, 1990
[51] Int. Cl.⁵ .......................................... F25B 21/00
[52] U.S. Cl. ........................................ 62/3.1; 505/891
[58] Field of Search ........................... 62/3.1; 505/891

[56] References Cited

U.S. PATENT DOCUMENTS

| | | |
|---|---|---|
| 428,057 | 0/1890 | Tesla . |
| 2,510,800 | 6/1950 | Chilowsky . |
| 2,589,775 | 3/1952 | Chilowsky . |
| 2,619,603 | 11/1952 | Chilowsky ............................. 310/4 |
| 3,215,572 | 11/1965 | Papell ..................................... 149/2 |
| 3,278,441 | 10/1966 | Manuel et al. . |
| 3,281,403 | 10/1966 | Manuel et al. . |
| 3,413,814 | 12/1968 | Van Geuns . |
| 3,790,829 | 2/1974 | Roth . |
| 4,033,734 | 7/1977 | Steyert, Jr. et al. . |
| 4,069,028 | 1/1978 | Brown ....................................... 62/3 |
| 4,735,053 | 4/1988 | Carpetis ................................. 62/3.1 |
| 4,956,976 | 9/1990 | Kral et al. ............................. 62/3.1 |
| 4,970,866 | 11/1990 | Mokadam ............................. 62/3.1 |

OTHER PUBLICATIONS

Brown, G. V., "Basic Principles and Possible Configurations of Magnetic Heat Pumps".
Brown, G. V., "Magnetic Heat Pump".
Barclay, J. A., "Magnetic Refrigeration: A Review of a Developing Technology," *Advances in Cryogenic Engineering*, vol. 33 (1987), p. 719 (abstract).
Hashimoto, T. et al., "Recent Progress in Magnetic Refrigeration Studies," *Advances in Cryogenic Engineering*, vol. 33 (1987), p. 733 (abstract).
Matsumoto, K. et al., "An Ericsson Magnetic Refrigerator for Low Temperature," *Advances in Cryogenic Engineering*, vol. 33 (1987), p. 743 (abstract).
Jaeger, S. R. et al., "Analysis of Magnetic Refrigeration With External Regeneration," *Advances in Cryogenic Engineering*, vol. 33 (1987), p. 751 (abstract).
Kirol, L. D., "Rotary Recuperative Magnetic Heat Pump", *Advances in Cryogenic Engineering*, vol. 33 (1987), p. 757 (abstract).
Brown, G. V., "Magnetic Heat Pumping Near Room Temperature", *Journal of Applied Physics*, vol. 47, No. 8, (Aug. 1976) pp. 3673–3680.
Hashimoto, T., "Magnetic Refrigeration in the Temperature Range From 10K to Room Temperature: the Ferromagnetic Refrigerants," *Cryogenics* (Nov. 1981) pp. 647–653.
NASA Tech Brief LEW-12508, "A High-Efficiency Practical Magnetic Heat Pump" (Feb. 1978).
Rennie, J. et al. eds., *Privileged Breakthrough Information* Newsletter, May 1, 1988.
Basiulis, A. et al., "Thermal Management of High Power PWB's Through the Use of Heat Pipe Substrates," *Proceedings of the Sixth International Electronics Packaging Conference* (Nov. 1986), p. 501.
Basiulis, A. et al., "Improved Reliability of Electronic Circuits Through the Use of Heat Pipes," presented at the 37th National Aerospace and Electronics Conference, Dayton, Ohio, May 20–24 May 1985.
Peterson, G. P., "Heat Removal Key to Shrinking Avionics", *Aerospace America* (Oct. 1987), pp. 20–22.
"New Radiator System Designed for Large Spacecraft," *Aerospace Engineering* (Jan. 1988) pp. 52–56.
Hughes Aircraft Company Heat Pipes Data Sheet (Jan. 1985).
Hughes Aircraft Company, *Avionics Thermal Control with Heat Pipes* Brochure (1986).
*Hughes Circuit Card Heat Pipes* (placard).
*Hughes Heat Pipes for Thermal Management of Space Systems* (placard).
Hughes Aircraft Company *Thermal Products* Brochure (1987).

*Primary Examiner*—Ronald C. Capossela
*Attorney, Agent, or Firm*—Fay, Sharpe, Beall, Fagan, Minnich & McKee

[57] ABSTRACT

A magnetic heating and cooling system is disclosed. A magnetic fluid is pumped through at least a portion of the heating and cooling system. The fluid moves through the field of a superconducting or other type of magnet. When the fluid enters the magnetic field, it is heated as a result of the magnetization. Heat from the magnetic fluid is then transferred to a regenerator chamber. When the fluid leaves the magnetic field it is chilled. Heat from a regenerator chamber is then transferred to the fluid. External loads or sinks are heated or cooled.

5 Claims, 3 Drawing Sheets

MAGNETIC HEATING AND COOLING SYSTEMS

BACKGROUND OF THE INVENTION

This invention pertains to the art of heating and cooling systems, and more particularly to magnetic heating and cooling systems.

The invention is particularly applicable to magnetic heating or cooling systems which comprise ferromagnetic or ferrimagnetic materials, and will be described with particular reference thereto. It will be appreciated, however, that the invention may be advantageously employed in other environments and applications.

U.S. Pat. No. 4,069,028 which issued on Jan. 17, 1978 to Gerald V. Brown, fully incorporated herein by reference, discloses a system for effecting heating or cooling. The system calls for the use of a solid ferromagnetic material which functions as a refrigerant with its Curie point near room temperature (e.g., the rare earth element gadolinium). The use of an appropriate magnetic field to achieve magnetic heating and cooling of the ferromagnetic material or refrigerant, combined with a liquid accumulator or regenerator, together extend the temperature differential there to a wider level than was achieved in the past.

The system disclosed in Brown employs a solid ferromagnetic material immersed in the liquid of the accumulator. A variety of geometries of the solid ferromagnetic material are described The various geometries are used and described in an effort to disclose an appropriate system for maximizing the heat transfer, and further to simplify the achievement of relative motion between the solid refrigerant and the accumulator liquid while minimizing liquid turbulence. Liquid turbulence is an undesirable factor in attempting to achieve temperature stratification within the system.

Brown provides a system for achieving cost effective heating and cooling in a number of applications surrounding the approximate room temperature regime. It appears, however, that the complexity of the mechanical design required to implement the Brown system may make the system economically uncompetitive. Furthermore, the complexity of the Brown design may achieve a less-than-desired level of reliability.

It would be desirable to modify the system disclosed in Brown in such a way as to alleviate some of the mechanical design complexity in order to produce an economically competitive magnetic heating and cooling system.

It would be further desirable to design a magnetic heating or cooling system which would operate within reliable parameters.

The present invention contemplates a new and improved apparatus and process to overcome all of the above-referenced problems and others. The present invention provides a reliable magnetic heating and cooling system which is less complex than that disclosed in Brown, and offers an economical alternative to Brown.

BRIEF DESCRIPTION OF THE INVENTION

In accordance with the present invention, there is provided a heating and cooling system which comprises a cryogenic or superconducting magnet which magnetically heats ferromagnetic or ferrimagnetic materials for purposes of supplying heat to surrounding areas. When the magnetic materials leave the magnetic field, they are cooled, and this cooling permits the supply of refrigeration to surrounding areas.

In accordance with a more limited aspect of the invention, there is provided a system for magnetic heating and cooling which comprises a ferromagnetic or ferrimagnetic fluid comprised of an appropriate liquid and a colloidal dispersion of an appropriate ferromagnetic or ferrimagnetic material, or appropriate liquid-containing finely-divided solid ferromagnetic of ferrimagnetic particles comprising a slurry. Pumps are provided to keep the magnetic fluid or slurry flowing through a closed loop, while a superconducting magnet is used to apply a magnetic field to the ferromagnetic or ferrimagnetic fluid or slurry.

A principal advantage of the present invention is that the mechanical design of the present system is much less complex than that disclosed in the Brown patent.

Another advantage of the present invention is that it provides an economically competitive alternative to prior forms of magnetic heat pumping for heating and/or cooling.

Another advantage of the present invention is that the system operates consistently and provides results which are of a desired reliability.

Still other advantages and benefits of the invention will become apparent to those skilled in the art upon a reading and understanding of the following detailed description.

DETAILED DESCRIPTION OF THE PREFERRED AND ALTERNATIVE EMBODIMENTS

Figure 1:
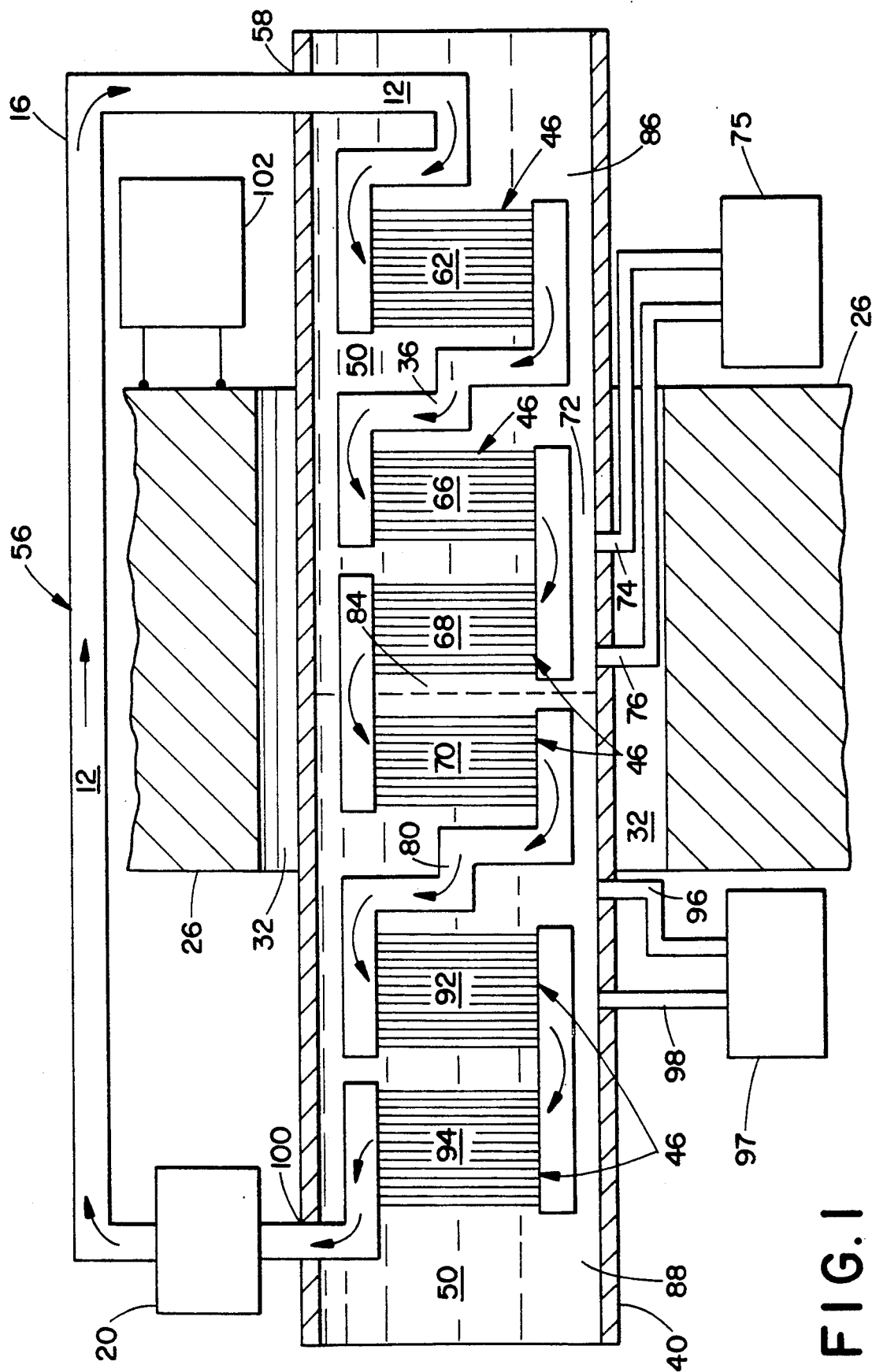
FIG. 1 represents a magnetic heating or cooling system in accordance with the present invention.

Referring now to the drawing wherein the showings are for purposes of illustrating the preferred embodiment of the invention only and not for purposes of limiting same, the FIGURES show preferred and alternative embodiments of a magnetic heating or cooling system in accordance with the present invention As stated above, the system taught by Brown calls for a solid ferromagnetic material immersed in the liquid accumulator. The present invention is directed to a modification of the Brown system for the purpose of reducing the complexity of mechanical design as well as making the system economically competitive. In addition, the present invention offers consistent, reliable results.

The present invention addresses replacing the solid rare earth ferromagnetic refrigerant (gadolinium) of Brown with a ferromagnetic fluid comprised of an appropriate liquid and a colloidal dispersion of an appropriate ferromagnetic material. In the Brown system, the ferromagnetic material would be gadolinium or a similar element or compound. Other materials, however, having different Curie points could be chosen for use in different temperature regimes. The material chosen preferably has a Curie temperature reasonably near to the temperature which is desired to be achieved in surrounding areas.

Preparation of a ferromagnetic fluid has been described in the Papell patent, U.S. Pat. No. 3,215,572, incorporated herein by reference. In that patent, Papell discloses a low viscosity magnetic fluid that is obtained by the colloidal suspension of magnetic particles. According to the Papell patent, a low concentration of ferromagnetic material in the liquid yields a low viscosity, pumpable magnetic fluid.

In addition to Papell, others have produced magnetic fluids with substantially higher magnetic material concentration. For example, U.S. Pat. No. 3,278,441 to Manuel, also incorporated herein by reference, teaches a method of preparing a magnetic metal-containing polymer composition. Magnetic polymers, such as, for example, those disclosed in Manuel, can be used in their liquid form as the magnetic fluid used in the present invention.

For purposes of the present invention, it is desirable to obtain a magnetic fluid having an optimum solid material concentration in order to achieve an efficient magnetic heating or cooling effect by the system. Heating and or refrigeration capacity, with a given magnetic field strength, is a function of the mass flow rate. Efficiency requires a balancing of the solid material concentration against the power required for pumping. Along these lines, it is important to achieve an appropriate concentration of solid ferromagnetic material (i.e., packing fraction). Accordingly, it may be preferable to form a solution which is a ferromagnetic fluid by creating a liquid/solid slurry of desired solid concentration in place of a colloidal suspension. Alternately, the two methods may be combined.

Attention is now directed to FIG. 1 which shows a magnetic heating or cooling system. Ferromagnetic fluid 12 circulates or flows about the system in a closed loop. The material flows through a conduit 16 which provides a sealed, continuous path for the circulating fluid. Arrows show the general direction of the flow of the ferromagnetic material as it completes its circuit. A mechanical pump 20 provides the necessary assistance which causes the fluid to flow. While FIG. 1 shows only a single pump, it is foreseeable that additional pumps could be used. Further, a variety of pumping techniques and configurations can be used to cause the ferromagnetic fluid to flow.

A cryogenic or electromagnetic superconducting magnet 26 surrounds a portion of the conduit 16 through which the ferromagnetic fluid 12 flows. The conduit 16 passes through a magnetic bore 32 defined by superconducting magnet 26. When the fluid enters the magnetic field approximately at the point designated 36, the magnetic bore, the temperature of the ferromagnetic fluid undergoes a change. The ferromagnetic fluid temperature rises as a result of its exposure to the magnetic field provided by the superconducting magnet 26.

In general, the system is comprised of a regenerator chamber 40 and a series of heat exchangers denoted generally as 46. Regenerator fluid or liquid 50 is present inside the regenerator chamber 40.

As will be noted in FIG. 1, the pump 20 causes the ferromagnetic fluid or slurry to circulate through the magnetic bore 32 and the regenerator chamber 40. FIG. 1 also shows that a portion 56 of the ferromagnetic fluid's circuit is outside the regenerator chamber. As the ferromagnetic fluid 12 flows along portion 56 outside the regenerator chamber, its temperature approximates the ambient temperature. Once the fluid reaches the regenerator chamber at 58, it warms up a bit as a result of a transfer of heat from the regenerator fluid 50.

The ferromagnetic fluid flows through a first heat exchanger 62 wherein the ferromagnetic fluid 12 receives heat from regenerator liquid 50. The somewhat warmed fluid 12 continues on through the regenerator chamber 40 and at 36 it enters the magnetic bore region 32. At this point, the magnetic fluid 12 is exposed to a magnetic field emanating from the superconducting magnet 26. Because the ferromagnetic fluid 12 has entered the magnetic field, the ferromagnetic fluid undergoes heat of magnetization. Heat is generated within the magnetic fluid as a result of its entry into the magnetic field. Its temperature does not further increase as a result of being exposed to the magnetic field for a period of time.

Additional heat exchangers 66, 68 and 70 are shown inside the portion of the regenerator chamber that is within the magnetic bore 32. Although FIG. 1 shows three (3) heat exchangers 66, 68, and 70 inside the bore 32, the total number is arbitrary. It is possible that there could be one, two, or even four, five or six or more heat exchangers within the bore. The number and configuration of the heat exchangers is such as to transfer heat most effectively from the magnetic fluid to the regenerator fluid.

When the ferromagnetic fluid 12 is exposed to heat exchanger 66, the heat from the ferromagnetic fluid 12 is transferred to the regenerator liquid 50 in the regenerator chamber 40. At point 72 in the regenerator chamber, when the temperature of the regenerator liquid has been substantially elevated, the heated regenerator liquid circulates out of the regenerator chamber through outlet 74 where heat is rejected or transferred to an external load or heat sink 75. When the regenerator liquid from which heat has been transferred circulates back into the regenerator chamber at inlet 76, its temperature has been decreased from its level at point 72.

Once the ferromagnetic fluid 12 leaves heat exchanger 66, it flows through heat exchanger 68, and additional heat is transferred from the magnetic fluid to the regenerator liquid 50. The ferromagnetic fluid 12 then enters heat exchanger 70 and additional heat is removed from the ferromagnetic fluid and transferred to the regenerator chamber fluid 50. As the ferromagnetic fluid 12 exits the magnetic bore at 80, it is abruptly chilled as a result of being demagnetized, and the temperature decreases.

An insulating liquid separation diaphragm 84 divides the regenerator into two sections, namely the hot section 86 and the cold section 88. Regenerator liquid 50 does not flow through the separation diaphragm 84, and the fluid in the hot section 86 thus does not mix with the fluid in the cold section 88.

As stated above, when the ferromagnetic fluid leaves the magnetic bore at 80, it is suddenly "chilled" as a result of leaving the magnetic field.

Upon leaving the bore 32, the fluid 12 enters heat exchangers 92 and 94, respectively, wherein heat present in the surrounding regenerator liquid 50 is transferred to the ferromagnetic fluid. In effect, the cold from the ferromagnetic fluid is transferred to the regenerator fluid. The cold which is achieved in the regenerator fluid in portion 88 of the regenerator chamber can be used for external refrigeration or air conditioning purposes. Specifically, cold regenerator liquid 50 is circulated out of the regenerator chamber at 96 to a heat source 97 for refrigeration or air conditioning purposes at which point heat is transferred to the liquid 50. Regenerator liquid 50 is returned to the regenerator chamber at 98 at an elevated temperature. It is to be understood that the location of exit ports, at 74 and 96, and reentry ports, at 76 and 98, will be selected for most efficient system performance.

Magnetic fluid 12 continues to flow through conduit 16 and exits the regenerator chamber at 100 where it is once again exposed to ambient temperatures. The cycle is repeated.

As will be noted, the system includes a cooling system 102 which is used to cool the superconducting magnet 26.

As discussed above, regenerator fluid separation diaphragm 84 divides the regenerator fluid into two regions, the hot region 86 and the cold region 88. The temperatures generated in the two regions are substantially stratified.

By contrast, the Brown system sets forth a mechanical system in which the physical motion of the solid elements can cause a resulting turbulence in the fluid, mixing cold and hot regions. The design of the Brown system and its operating speeds must be chosen to minimize this turbulent mixing at cold and hot regions.

The present system provides more efficient heating and cooling than Brown in part because the regenerator liquid is not turbulently mixed by virtue of passage of the ferromagnetic material through the magnet bore.

A generally continuous ring of magnetic fluid is present throughout the system. In other words, there are no gaping areas within conduit 16 which are substantially void of ferromagnetic fluid. Since the fluid is continuous throughout the system, the heating and cooling provided by the ferromagnetic system prove reliable within a predictable range.

With respect to the ferromagnetic fluid 12, the fluid portion can be comprised of either gas or liquid. An important feature of the fluid, however, is that it can carry ferromagnetic particles with it through the magnetic bore when the fluid is pumped. When the fluid is a liquid, the ferromagnetic particles can be in a colloidal dispersion or suspension within the fluid. Or, the particles could be otherwise disposed in the liquid and form a simple slurry; or, the two methods can be combined.

The ferromagnetic fluid is comprised of an appropriate fluid as well as an appropriate ferromagnetic material. It is suggested that the "appropriate" specific components be selected so as to most effectively operate properly within a desired temperature range. Furthermore, it is important that the materials be selected to provide the desired flow rates, both volumetric and mass.

The ferromagnetic material in the fluid may be supplied in a powdered form, requiring protection from oxidation. It is suggested that oxidation protection be obtained by using a non-oxidizing fluid carrier. On the other hand, it is possible that somewhat larger ferromagnetic particles could be supplied with a very thin anti-oxidation polymer coating applied thereon for use in certain applications.

The ferromagnetic material of choice is that material which has its Curie point in the temperature region of interest for the operating system. Also, it is possible to use mixes of different ferromagnetic powders or particles with different Curie points to provide an extended range of operating temperatures. Table I below includes a number of representative substances, and their respective Curie temperatures, which can be used as the ferromagnetic material in a magnetic heating-cooling system operating generally in the "room temperature" regime of interest in commercial refrigeration and air conditioning units. For other refrigeration requirements at substantially different temperatures, other ferromagnetic materials would be used.

TABLE 1*

| Substance | Curie Temperature (Kelvin) |
| --- | --- |
| Gd | 293 |
| $Gd_3Al_2$ | 287 |
| $Gd_5Si_4$ | 336 |
| $Y_2Fe_{17}$ | 317 |
| MnAs | 318 |
| MnP | 298 |
| CrTe | 333 |

*Hashimoto, T., et al. "Magnetic Refrigeration in the Temperature Range from 10 K to Room Temperature: The Ferromagnetic Refrigerants." Cryogenics, Nov. 1981, pp. 647, 652.

The mass flow rate of the ferromagnetic material through the magnet bore determines the maximum amount of heating and cooling. Maximum performance depends on a variety of design factors which include the efficiency of the regeneration performance; the efficiency of the heat transfer design; the efficiency of the pumping system; and other areas of the system.

Figure 2:
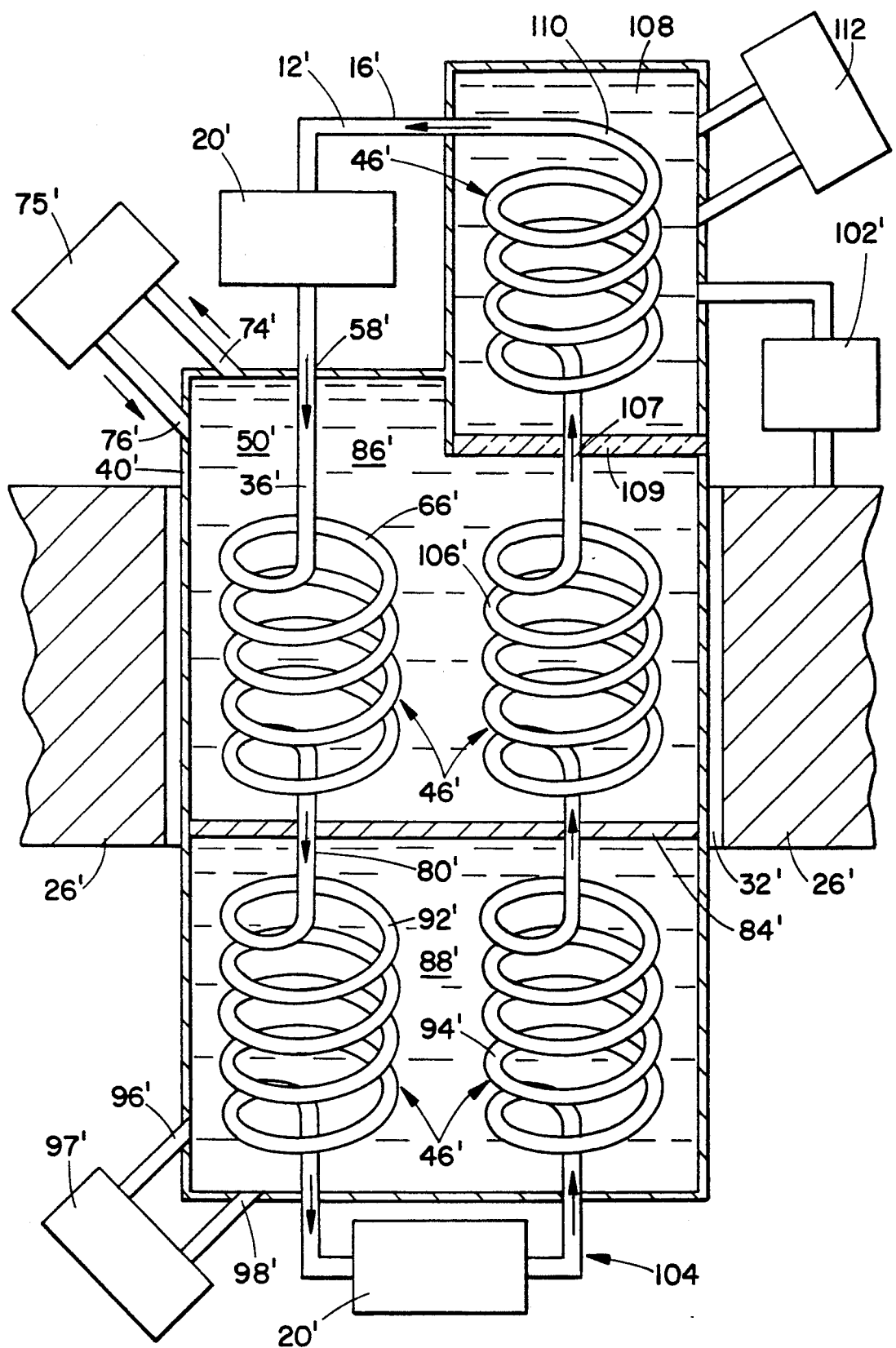
FIGS. 2-3 represent alternative embodiments of a magnetic heating or cooling system in accordance with the present invention.

FIG. 2 sets forth an alternate embodiment of the present invention. Like elements are denoted by primed (') numerals, and new elements are denoted by new numerals.

In FIG. 2, ferromagnetic fluid 12' flows through conduit 16'. The flow is assisted by one or a series of mechanical pumping means 20', and arrows show the direction of flow. Magnetic fluid 12' enters regenerator chamber 40' at 58'. Regenerator fluid 50' is present in the regenerator chamber. Once the fluid enters a magnetic field at 36' provided by cryogenic magnet 26', the fluid undergoes heat of magnetization. Heat exchanger 66' transfers heat from the ferromagnetic fluid to the regenerator fluid 50'. As with the system set forth in FIG. 1, the regenerator fluid in this warm portion 86 of the regenerator chamber is circulated out through outlet or channel 74' to a heat sink 75' where heat is transferred from the regenerator fluid. The regenerator fluid is then circulated back in to the chamber 40' through inlet 76'.

The fluid continues to flow until it exits the magnetic field at 80' at which transition point the temperature of the magnetic fluid decreases. Heat present in the regenerator fluid 50' in portion 80' of regenerator chamber 40' is transferred to the ferromagnetic fluid by way of heat exchanger 92'.

FIG. 2 shows that the ferromagnetic fluid is circulated outside of the regenerator chamber at a portion of conduit labelled 104; however, it is not necessary that the fluid actually leaves the chamber. Instead, the conduit 16 could simply be contained within the chamber.

The main difference between the system shown in FIG. 2 and that of FIG. I is that instead of returning the fluid to the entry 58' of the chamber 40' via a route that is outside of the field of magnet 26', the ferromagnetic fluid is returned to entry 58' by a route which flows back through magnetic bore 32'. Upon reentry into the magnetic field, the ferromagnetic fluid once again undergoes heat of magnetization. Heat exchanger 106 transfers heat from the ferromagnetic fluid to the regenerator chamber. The ferromagnetic fluid flows out of the magnetic field at 107 and is chilled. It then enters into a chamber 108 divided from regenerator chamber portion 86' by insulating diaphragm 109. Heat present in regenerator chamber 108 is transferred to ferromagnetic fluid by way of heat exchanger 110. Regenerator fluid present in chamber 108 is cooled and is circulated to a heat source 112. As an alternative, the cool regenerator liquid of chamber 108 can be used to supplement the magnet cooling system 102'.

Figure 3:
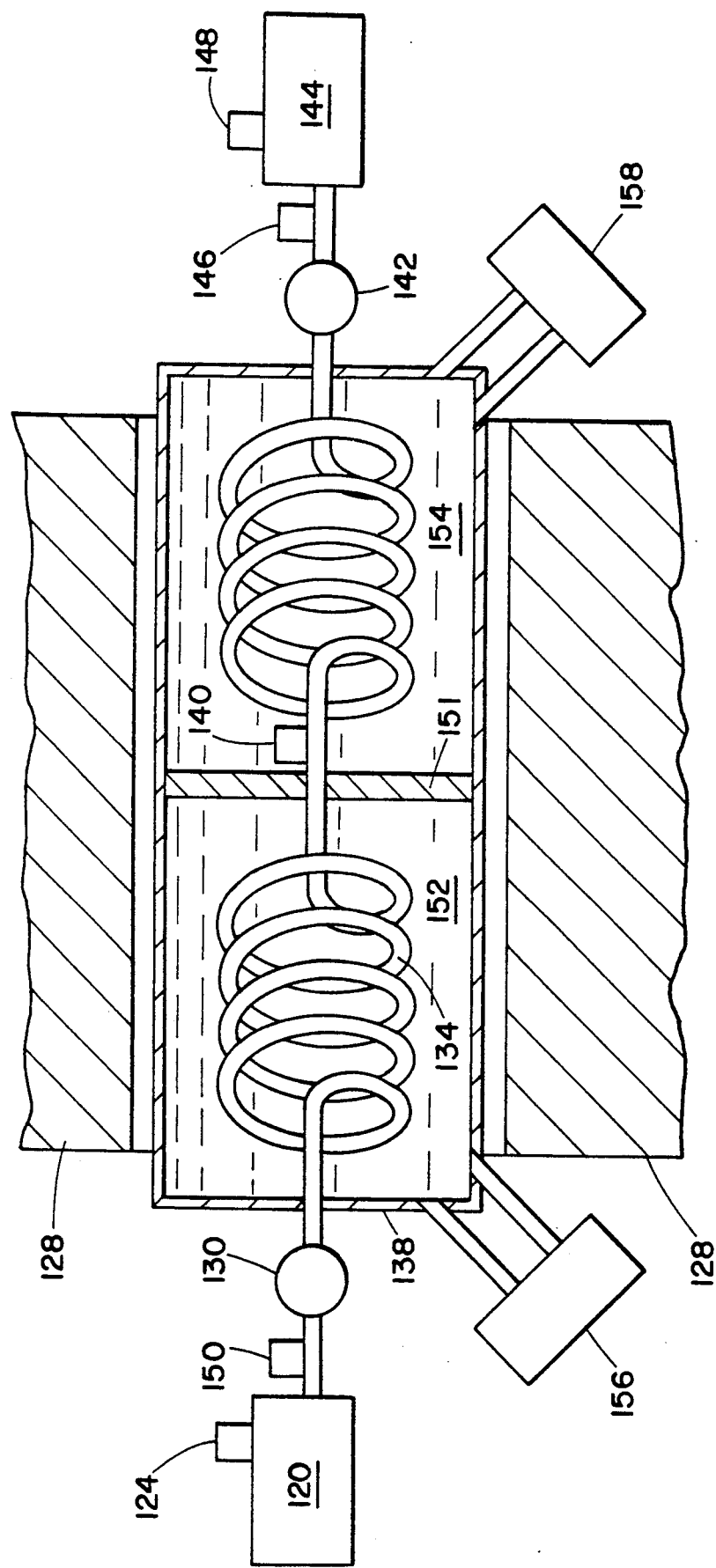

FIG. 3 shows a second alternate embodiment of the present invention. Specifically, FIG. 3 shows an electromagnet (switchable) system. This system undergoes a heating and cooling cycle.

Specifically, high pressure pump 120 provides a reservoir or accumulator for ferromagnetic fluid. When the reservoir is filled with ferromagnetic fluid or slurry, the high pressure pump is turned on. It pressurizes the volume of fluid or slurry to a level sufficient for the volume to flow as a "slug" fully through the system. When a set pressure level is reached, sensor 124 switches on electromagnet 128 and opens valve 130. The resulting fluid "slug" flows into the magnetic field wherein heat is generated. It flows through heat transfer coils 134 which transfer heat to the liquid in container 138.

When the fluid slug trailing edge passes sensor 140, the electromagnet is turned off. This causes the fluid to absorb heat from the liquid in chamber 138 as it flows through heat transfer coils 134. The fluid slug flows through open valve 142 into the pump accumulator 144. Sensor 146 senses the trailing edge of the fluid slug and closes valve 142 and turns on pump accumulator 144. When a preselected pressure is reached, sensor 148 opens the valve 142 and turns off the pump 144. The fluid slug flows from the right to left through the system (with the electromagnet 128 off) and through open valve 130. Sensor 150 senses the trailing edge of the fluid slug and closes valve 130 and turns on pump 120.

The efficiency of operation of the system may make desirable a partition 151 separating the container C into two chambers, the hot chamber 152 and the cold chamber 154. As shown, heat is rejected from the hot chamber 152 to a heat sink 156, and heat is absorbed by the cool chamber 154 from heat source 158.

The cycle set forth in FIG. 3 repeats and continues until the system is turned off. The ferromagnetic fluid is finally contained or stored in pump accumulator 120.

The invention has been described with reference to the preferred embodiment. Obviously modifications and alterations will occur to others upon a reading and understanding of the specification. It is intended to include all such modifications and alterations insofar as they come within the scope of the appended claims or the equivalents thereof.

Having thus described my invention, I claim:

1. A method for pumping heat for heating or refrigeration, comprising the steps of:
    exposing a system comprising a magnetic fluid to a magnetic field;
    causing the magnetic fluid to absorb heat of magnetization;
    transferring heat from the system to a heat sink;
    causing the magnetic fluid to exit the magnetic field, undergoing the cooling effect therefrom; and
    transferring heat to the system from a heat source.

2. The method according to claim 1 wherein the magnet is a refrigerated electromagnet.

3. The method of claim 1 wherein the magnet is a superconducting magnet.

4. The method of claim 1 wherein the magnet is a switchable on/off electromagnet.

5. The method according to claim 1 wherein the magnet is a non-refrigerated electromagnet.

* * * * *